United States Patent [19]

Yamakawa et al.

[11] Patent Number: 5,262,366
[45] Date of Patent: Nov. 16, 1993

[54] FORMATION OF A CERAMIC COMPOSITE BY CENTRIFUGAL CASTING

[75] Inventors: Akira Yamakawa; Yoshihiko Doi; Masaya Miyake, all of Itami, Japan

[73] Assignee: Sumitomo Electric Industries, Ltd., Osaka, Japan

[21] Appl. No.: 602,851

[22] Filed: Oct. 26, 1990

Related U.S. Application Data

[60] Division of Ser. No. 453,158, Dec. 18, 1989, Pat. No. 4,994,418, which is a continuation of Ser. No. 262,099, Oct. 19, 1988, abandoned, which is a continuation of Ser. No. 20,733, Mar. 2, 1987, abandoned.

[30] Foreign Application Priority Data

Mar. 17, 1986 [JP] Japan .................. 61-57059
Mar. 17, 1986 [JP] Japan .................. 61-57060
Mar. 31, 1986 [JP] Japan .................. 61-71317

[51] Int. Cl.$^5$ .................. C04B 35/58; C04B 35/76
[52] U.S. Cl. .................. 501/95; 501/97; 264/311
[58] Field of Search .................. 264/82, 60, 310, 311; 501/95, 97

[56] References Cited

U.S. PATENT DOCUMENTS

| | | | |
|---|---|---|---|
| 3,607,608 | 9/1971 | Siefort | 501/76 X |
| 3,689,614 | 9/1972 | Bortz et al. | 264/60 |
| 4,465,650 | 8/1984 | Ohno | 264/82 X |
| 4,572,902 | 2/1986 | Matano et al. | 264/82 X |
| 4,579,699 | 4/1986 | Verzemnieks | 264/82 X |
| 4,869,943 | 9/1989 | Corbin et al. | 264/60 X |
| 4,961,757 | 10/1990 | Rhodes et al. | 501/128 X |

*Primary Examiner*—Karl Group
*Assistant Examiner*—Chris Gallo
*Attorney, Agent, or Firm*—Wenderoth, Lind & Ponack

[57] ABSTRACT

A ceramic compact having excellent high temperature strength, toughness and reliability, which comprises a matrix preferably composed predominantly of silicon nitride and ceramic fibers uniformly dispersed in the matrix and orientated in a desired direction, said matrix and fibers being closely bonded by sintering. This compact is produced, for example, by preparing a shaped body of silicon, for example, in which ceramic fibers are uniformly dispersed by centrifugal casting and then heating and nitriding the shaped body in a nitrogen atmosphere to form a fiber-reinforced silicon nitride sintered compact. The ceramic fibers may include such fibers as aluminum oxide or silicon carbide fibers. Sintering assistants, such as silicon nitride, may be used to prepare the sintered compact.

5 Claims, 1 Drawing Sheet

FORMATION OF A CERAMIC COMPOSITE BY CENTRIFUGAL CASTING

This is a divisional application of Ser. No. 07/453,158, filed Dec. 18, 1989, now U.S. Pat. No. 4,994,418, which is a continuation application of Ser. No. 07/262,099, filed Oct. 19, 1988, now abandoned which in turn is a continuation application of Ser. No. 07/020,733, filed Mar. 2, 1987 now abandoned.

BACKGROUND OF THE INVENTION

1. Field of the Invention

This invention relates to a ceramic shaped body containing ceramic fibers and having an excellent strength and toughness, in particular, a ceramic silicon nitride ($Si_3N_4$) sintered compact and a process for the production of the same.

2. Description of the Prior Art

Ceramics have widely been used as electrically functional materials or mechanical and structural materials because of excellent properties thereof, but the practical use of ceramics has considerably been limited when utilizing the mechanical properties since there arises a problem that a sudden breakage or a large dispersion of the strength tends to occur due to the brittleness of ceramics.

Thus, various efforts have hitherto been made so as to improve the reliability or strength of ceramics. As to aluminum oxide ($Al_2O_3$), zirconium oxide ($ZrO_2$), silicon carbide (SiC) and silicon nitride ($Si_3N_4$), in particular, compositions and production conditions have been studied in detail. Furthermore, an incorporation of fibers, for example, metallic fibers and ceramic fibers has been studied to increase the strength and ceramics containing ceramic whiskers, for example, a silicon nitride compact containing fibrous silicon carbide dispersed have been reported as disclosed in Japanese Patent Application OPI (Kokai) No. 104069/1983.

However, the studies of the compositions and production conditions have failed to realize the anticipated results and the incorporation of fibers has met the problems that the production cost is high and the uniform dispersion of fibers is very difficult.

SUMMARY OF THE INVENTION

It is an object of the present invention to provide a ceramic compact with an excellent high temperature strength, toughness and reliability.

It is another object of the present invention to provide a fiber-reinforced silicon nitride ($Si_3N_4$) sintered compact excellent in strength as well as toughness.

It is a further object of the present invention to provide a process for producing such a ceramic compact in effective manner.

These objects can be attained by a ceramic compact comprising a matrix of silicon nitride and ceramic fibers uniformly dispersed therein and orientated in a predetermined direction, said matrix and fibers being closely bonded by sintering.

BRIEF DESCRIPTION OF THE DRAWING

The accompanying drawing is to illustrate the principle and merits of the present invention.

DETAILED DESCRIPTION OF THE INVENTION

Figure 1:
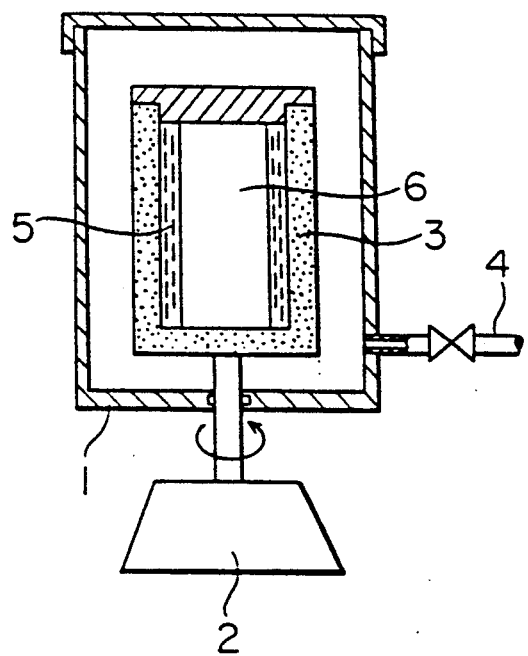
FIG. 1 is a cross-sectional view of one embodiment of an apparatus for centrifugal casting, suitable for practicing the process of the present invention.

Under the situation, the inventors have made various efforts to obtain a ceramic compact excellent in high temperature strength, toughness and reliability and consequently, have found that a composite composition in which ceramic fibers are uniformly dispersed exhibits very excellent properties or performances, in particular, a combination of a matrix of silicon nitride and ceramic fibers is more excellent and a method comprising dispersing silicon and ceramic fibers and nitriding the silicon to form silicon nitride ($Si_3N_4$) is effective for obtaining a more compact sintered body.

That is, according to the present invention, there is provided a ceramic compact comprising a matrix of silicon nitride ($Si_3N_4$) and ceramic fibers, preferably consisting of silicon carbide whisker, uniformly distributed and dispersed therein, said matrix and fibers being closely bonded by sintering, preferably reaction sintering.

The above described ceramic compact can be produced, for example, by a process comprising obtaining a shaped body of silicon (Si) in which ceramic fibers are uniformly dispersed and then heating and nitriding the shaped body in a nitrogen atmosphere to form a fiber-reinforced silicon nitride ($Si_3N_4$) compact. Particularly preferred embodiments of the present invention are the above described processes wherein the ceramic fibers are whiskers and wherein the shaped body of silicon is obtained by dispersing silicon powder and ceramic fibers in a solvent, charging the resulting slurry in a mold through which only the solvent is permitted to pass and then subjecting the slurry to centrifugal force, thus forming the silicon body containing the ceramic fibers orientated in parallel with the inner surface of the mold.

The ceramic shaped body of the present invention consists substantially of a ceramic matrix and ceramic fibers uniformly distributed and dispersed therein with a certain directional property.

In the present invention, the ceramic matrix consists predominantly of silicon nitride ($Si_3N_4$), which can preferably be obtained by forming a shaped body of a mixture of silicon and ceramic fibers and nitriding the silicon to give $Si_3N_4$. In the prior art process, a shaped body of silicon nitride and ceramic fibers is obtained and then subjected to compacting, while in the present invention, the compacting is carried out by nitriding silicon so as to prevent from shrinkage of the volume during the compacting. That is, in general, it is difficult to change and compact the dimensions of the $Si_3N_4$ compact containing ceramic fibers during sintering because of the presence of the fibers. The present invention, however, aims at obtaining a fully dense $Si_3N_4$ compact without changing the dimensions thereof.

In this embodiment, any of long fibers and short fibers can be used as the ceramic fibers, and in particular, whiskers are preferred from the standpoint of compatibility. Whiskers should be used under sufficiently dispersed state. As the ceramic fibers, there can be used fibers of alumina ($Al_2O_3$), silicon nitride ($Si_3N_4$), silicon carbide (SiC), carbon (C), potassium titanate ($K_2TiO_3$) and zirconium oxide ($ZrO_2$) wherein silicon carbide whisker is particularly preferably used because of being so compatible with a matrix of silicon nitride that best results are given. The quantity of the ceramic fibers should be 0.1 to 45% by volume, since if it is less than 0.1% by volume, no effect appears by the addition thereof, while if more than 45% by volume, the fibers are too many to be uniformly dispersed.

Production of the shaped body is carried out, for example, by a process comprising mixing a silicon powder and ceramic fibers in the form of a slurry and then subjecting the slurry to centrifugal casting in a mold. According to this process, the ceramic fibers can be uniformly dispersed, orientated and shaped or formed with a higher efficiency. As a solvent for mixing a silicon powder and ceramic fibers to form a slurry, there can be used, for example, water, alcohol, acetone, hexane and the like.

FIG. 1 is a schematic view of one embodiment of an apparatus for centrifugal casting, used in the process of the present invention, in which a casting mold 3 is provided in a closed vessel 1 to be revolved by a rotation driving means 2 and the vessel 1 can be evacuated via a pipe 4 by a vacuum pump (not shown). The casting mold 3 is made of a material capable of permitting only a solvent in a slurry 6 containing a material 5 for a compact to pass therethrough, for example, gypsum, filter paper and the like. Particularly, gypsum or filter paper is preferably used because of the ease of making the casting mold and the lower price. For casting, a reducing atmosphere can be applied with better results. Referring to FIG. 1, the material 5 for a sintered compact is being formed on the inner wall of the casting mold 3 from the slurry 6.

However, a process for obtaining a shaped body of silicon in which ceramic fibers are uniformly distributed and dispersed according to the present invention is not limited to the above described centrifugal casting process, but can be carried out by a conventional slurry casting or dry process pressing.

The thus obtained shaped body is sintered under the ordinary silicon nitride reaction sintering conditions, preferably at a temperature of 1300° to 1450° C. in a nitrogen gas atmosphere.

In the first embodiment of the present invention as described above, a fiber-reinforced silicon nitride compact having an excellent high temperature strength, toughness and impact strength can readily be obtained by uniformly dispersing ceramic fibers with a large strength and after preparing a shaped body, subjecting silicon to reaction sintering, thus forming a sintered compact body as $Si_3N_4$.

In a second embodiment of the present invention, a fiber-reinforced silicon nitride ($Si_3N_4$) compact is produced by a process comprising mixing ceramic fibers and a silicon powder containing 0.5 to 40% by weight of at least one member selected from the group consisting of aluminum oxide ($Al_2O_3$), aluminum nitride (AlN), zirconium oxide ($ZrO_2$), yttrium oxide ($Y_2O_3$), magnesium oxide (MgO), cerium oxide ($CeO_2$) and lanthanum oxide ($La_2O_3$), preparing a shaped body of the resulting mixture in such a manner that the ceramic fibers are orientated in a predetermined direction, heating and nitriding the shaped body in a nitrogen atmosphere and then further sintering and compacting the shaped body at a higher temperature in a nitrogen atmosphere.

The silicon nitride ($Si_3N_4$) forms a sintered compact body with at least one sintering aid selected from the group consisting of $Al_2O_3$, AlN, $ZrO_2$, $Y_2O_3$, MgO, $CeO_2$ and $La_2O_3$.

The quantity of the sintering assistant is preferably 0.5 to 40% by weight based on the silicon nitride, since if less than 0.5% by weight, compacting of a sintered body is insufficient, while if more than 40% by weight, the high temperature properties such as high temperature strength and oxidation resistance are markedly deteriorated. Better results can be obtained by adding at least two sintering assistant in combination.

As the ceramic fibers, there can be used the same ceramic fibers in the same proportion as in the first embodiment.

The matrix of silicon nitride ($Si_3N_4$) is formed by subjecting a shaped or formed body of silicon to reaction sintering in nitrogen gas at a temperature of 1300° to 1450° C. Since a sintered compact body is hardly obtained by only the reaction sintering, the product is preferably subjected to further sintering in nitrogen gas at a temperature of 1700° to 1900° C. It is preferable to compress this nitrogen gas in order to prevent $Si_3N_4$ from decomposition, but is not always essential. As occasion demands, the use of a hot hydrostatic press using a high pressure nitrogen gas is preferable to attain better results.

A process for producing the above described ceramic compact according to this embodiment will now be illustrated.

Firstly, a ceramic shaped body comprising silicon grains, ceramic grains and ceramic fibers orientated in a direction along the contour of the ceramic shaped body is obtained by a novel shaping method utilizing centrifugal force to achieve the orientation of the fiber components, which method corresponds to an improvement of the slip cast method commonly used in the production of ceramics according to the prior art. Even when a slurry is merely charged in a casting mold and cast, not only the orientation of the fiber components is insufficient, but also the distribution thereof is not uniform. On the other hand, the centrifugal casting method can give a uniform orientation and distribution of the fiber components.

In the second embodiment of the present invention, therefore, a silicon powder, at least one sintering assistant selected from the group consisting of $Al_2O_3$, AlN, $ZrO_2$, $Y_2O_3$, MgO, $CeO_2$ and $La_2O_3$, and fibers or whiskers selected from the group consisting of those of SiC, $Si_3N_4$, $Al_2O_3$, $ZrO_2$, C and $K_2TiO_3$ are mixed with a solvent such as water, alcohol, acetone or hexane to form a slurry and then the resulting slurry is subjected to centrifugal casting to obtain a shaped body in which the fiber components are orientated along the contour of the shaped body and uniformly dispersed.

Then, the thus resulting shaped body is subjected to reaction sintering in nitrogen at 1300° to 1450° C. to convert the silicon of the matrix in the shaped body into $Si_3N_4$ as described above, and further sintered in nitrogen at 1700° to 1900° C. to obtain a fiber-reinforced $Si_3N_4$ sintered compact. The nitrogen gas is preferably compressed so as to prevent $Si_3N_4$ from decomposition and a hot hydrostatic press using a high pressure nitrogen gas is preferably used.

In a third embodiment of the present invention, there is provided a process for the production of a ceramic composite, characterized by shaping ceramic fibers into a shaped body with a desired size, impregnating the shaped body with a slurry containing a ceramic powder or silicon powder as a predominant component, drying and then sintering.

In this embodiment, it is more preferable to use silicon carbide (SiC) whiskers as the ceramic fibers, a shaped body of ceramic fibers, having a porosity of 95 to 55%, as the shaped body, and SiC, $Si_3N_4$, $Al_2O_3$ or ZrO$_2$ powder as the ceramic powder. More preferably, the impregnation with a slurry is carried out by centrifugal casting, as described above, and a shaped body is impregnated with a slurry containing silicon as a predominant component, dried and then subjected to reaction sintering in nitrogen gas.

In this specification, the above described porosity is defined by the following formula (1):

$$\text{Porosity} = \frac{\text{Fiber Density} - \text{Preform Density}}{\text{Fiber Density}} \quad (1)$$

Firstly, ceramic fibers are shaped into a preform having a porosity of 95 to 55% as represented by the formula (1). This means that a ceramic powder to be impregnated will be dispersed in the pores of the preform, but if the porosity is more than 95%, the preform is hard to hold a desired shape, while if less than 55, the powder is too few to achieve compacting by sintering. The preform is generally prepared by a pressing method.

In the third embodiment, any continuous fibers and short fibers can be used and the same materials can be used therefor as in the foregoing embodiments.

The resulting preform is then impregnated with a ceramic powder or a powder containing predominantly silicon, for example, by a method comprising dispersing the powder in a solvent, impregnating the preform with the resulting slurry and then evaporating the solvent.

Useful examples of the ceramic powder are SiC, Si$_3$N$_4$, Al$_2$O$_3$ and ZrO$_2$. Furthermore, a sintering aid such as Y$_2$O$_3$ can be added to the ceramic powder or silicon powder. As the solvent, for example, there are used water, alcohol and the like and in the case of the ceramic powders, alcohol is preferable in order to prevent the powders from oxidation.

A preform having a porosity of 95 to 55%, i.e. having a fiber content of 5 to 45% by volume is impregnated with a ceramic powder or silicon powder, thus obtaining a shaped body having a powder content of 5 to 75% by volume and a total quantity of the fiber and powder of 50 to 80% by volume.

The impregnation is preferably carried out by a centrifugal casting method using a centrifugal force whereby the preform is uniformly impregnated with a slurry and the removal of the solvent can rapidly be carried out.

The centrifugal casting method is carried out, for example, by an apparatus as shown in FIG. 1, but in this example, the casting mold 3 is formed so as to be adapted to the contour of a preform 5 and made of a material capable of permitting only a solvent in a slurry 6 containing a ceramic powder or silicon powder to pass therethrough, for example, gypsum, filter paper and the like. Particularly, gypsum or filter paper is preferably used because of the ease of making the casting mold and the lower price. As shown in FIG. 1, the preform 5 is set in the mold 3, the slurry 6 is poured in the preform 5 and the preform 5 is impregnated with the powder while subjecting to centrifugal force. During the casting, a reducing atmosphere is preferably used for good results.

The resulting shaped body is dried in a known manner and then sintered. In the case of using Si$_3$N$_4$ as the matrix, in particular, a shaped body impregnated with a silicon powder is obtained and subjected to reaction sintering in an atmosphere of nitrogen to form Si$_3$N$_4$. Shrinkage of the Si$_3$N$_4$ in the ceramic fibers during sintering is hard to achieve because it is difficult to shrink the ceramic fibers. However, when a silicon powder is subjected to reaction sintering, a sintered compact body can easily be obtained without the necessity of the volume shrinkage.

As illustrated above, the feature of the third embodiment of the present invention consists in obtaining a composite of a ceramics and ceramic fibers by previously impregnating a preform of the ceramic fibers with a slurry of a ceramic powder or silicon powder, drying to remove the solvent and sintering. According to the present invention, a uniform dispersion of ceramics and ceramic fibers is thus made possible, which has hitherto been considered difficult. Furthermore, when using a centrifugal casting method utilizing a centrifugal force in order to fill a preform with a ceramic powder or silicon powder, a uniform shaped body can be given.

According to the present invention, therefore, there is provided fiber-reinforced silicon nitride ceramics excellent in strength as well as toughness by the use of a ceramic shaped body consisting essentially of a ceramic matrix and ceramic fibers, characterized in that the ceramic fibers are orientated. This ceramic compact is very effective as structural materials at high temperatures, for example, structural materials for gas turbines, because of having a higher strength at high temperatures and toughness. This is significant since the ceramics of the prior art are lacking in the high temperature strength and toughness and thus have not been put to practical use.

Moreover, the process of the present invention has the advantage in addition to the provision of the above described fiber-reinforced silicon nitride compact that it enables the use of a centrifugal casting method, thus reducing the production cost and providing the compact economically.

The following examples are given in order to illustrate the instant invention in greater detail without limiting the same.

EXAMPLE 1

15% by weight of SiC whiskers with a mean grain size of 0.3 $\mu$m and a length of 50 $\mu$m were added to a Si powder with a mean grain size of 0.5 $\mu$m and mixed with water as a solvent for 8 hours to form a slurry containing Si and SiC. The resulting slurry was subjected to centrifugal casting using a gypsum mold to obtain a shaped body with an outer diameter of 30 mm, inner diameter of 20 mm and length of 60 mm, which was then dried at 100° C. for 3 days and further subjected to reaction sintering in a nitrogen stream at 1350° C. for 8 hours, thus obtaining a sintered Si$_3$N$_4$ compact with a density of 2.90.

The compact had a structure such that the SiC whiskers were laminarly orientated, a bending strength at room temperature of 60 kg/mm$^2$ and a bending strength at 1200° C. of 45 kg/mm$^2$, which was considered as a more excellent high temperature strength. In addition, the compact exhibited a Charpy impact value of 0.5 kg/cm$^2$ being at least 5 times as large as that of an Si$_3$N$_4$ compact containing no whisker.

In comparison with an ordinary Si$_3$N$_4$ compact with a density of 3.15, bending strength at room temperature of 75 kg/mm$^2$ and bending strength at 1200° C. of 35 kg/mm$^2$, it will clearly be understood that the composite ceramics obtained according to the present invention are more excellent in properties, in particular, high temperature strength.

EXAMPLE 2

The slurry obtained in Example 1 was dried and then compressed by a mechanical press to obtain a shaped body with a width of 50 mm, length of 50 mm and height of 20 mm. The resulting shaped body was sintered in an analogous manner to Example 1, thus obtaining a sintered $Si_3N_4$ compact with a density of 2.85, bending strength at room temperature of 50 kg/mm$^2$, bending strength at 1200° C. of 65 kg/mm$^2$ and Charpy impact value of 0.5 kg/cm$^2$. The compact of the present invention exhibited more excellent high temperature strengths than the ordinary $Si_3N_4$ compact.

EXAMPLE 3

75% by weight of Si powder with a mean grain diameter of 0.7 µm, 5% by weight of $Al_2O_3$, 5% by weight of $Y_2O_3$ and 15% by weight of SiC whiskers with a diameter of 0.3 µm and length of 60 µm were mixed and dispersed in ethanol to form a slurry. The resulting slurry was then subjected to centrifugal casting to obtain a shaped body in which the whiskers are orientated in parallel with the inner wall of the casting mold and which had an outer diameter of 30 mm, inner diameter of 20 mm and length of 60 mm. This shaped body was then subjected to reaction sintering in a nitrogen stream at 1380° C. and further sintered in nitrogen at 1750° C. and 5 atm for 2 hours.

The thus obtained compact had a relative density of 95%, bending strength at room temperature of 70 kg/mm$^2$, bending strength at 1200° C. of 70 kg/mm$^2$ and $K_{IC}$ (stress intensity factor) of 9.5 MN/m$^{3/2}$.

EXAMPLE 4

Sintering assistants and ceramic fibers as shown in Table 1 were mixed with Si powder and subjected to production of ceramic compacts in an analogous manner to Example 3. The compacts had properties shown in Table 1.

It is apparent from these results that if the quantity of a sintering assistant is less than 0.5% by weight or more than 40% by weight, the properties of the compact are largely degraded and the quantity of the sintering assistant ranging from 0.5% by weight to 40% by weight is optimum for the present invention.

60 mm, thickness of 10 mm and porosity of 85%. On the other hand, 5% by weight of α-type $Al_2O_3$ powder having a mean grain diameter of 0.4 µm and 5% by weight of $Y_2O_3$ powder having a mean grain diameter of 1.0 µm were added to $Si_3N_4$ powder having a mean grain diameter of 0.5 µm and dispersed in ethanol to form a slurry. The preform was impregnated with the slurry, dried at 80° C. for 2 days and sintered at 1800° C. in a nitrogen gaseous atmosphere under a pressure of 1 atm for 2 hours.

The thus resulting sintered compact had a higher strength, higher toughness and more excellent high temperature strength, i.e. a relative density of 90%, 3 points bending strength at room temperature of 80 kg/mm$^2$, 3 points bending strength at 1200° C. of 75 kg/mm$^2$ and breakage toughness $K_{IC}$ of 12 MN/m$^{3/2}$.

EXAMPLE 6

Using a similar SiC whisker assembly to that of Example 5, a whisker preform having an outer diameter of 30 mm, inner diameter of 20 mm and length of 60 mm was obtained and impregnated with a slurry prepared in an analogous manner to Example 5 by centrifugal casting. The resulting impregnated preform was then sintered under similar conditions to those of Example 5 to yield a sintered compact.

The thus resulting compact had similar excellent properties to Example 5, i.e. a relative density of 92%, 3 points bending strength at room temperature of 80 kg/mm$^2$, 3 points bending strength at 1200° C. of 75 kg/mm$^2$ and breakage toughness $K_{IC}$ of 13 MN/m$^{3/2}$.

EXAMPLE 7

A SiC preform was obtained and impregnated with Si powder in an analogous manner to Example 5. The thus obtained preform was then subjected to reaction sintering in nitrogen gas at 1350° C. for 5 hours at 1 atm.

The thus resulting compact had similar excellent properties to Example 5, i.e. a relative density of 93%, 3 points bending strength at room temperature of 70 kg/mm$^2$, 3 points bending strength at 1200° C. of 70 kg/mm$^2$ and breakage toughness $K_{IC}$ of 12 MN/m$^{3/2}$.

EXAMPLE 8

15% by weight of β-type $Si_3N_4$ whiskers with a mean

TABLE 1

| Sintering Assistant and Quantity Thereof (wt %) | | Ceramic Fibers | Properties of Compacts | | | Remarks |
|---|---|---|---|---|---|---|
| | | | Density | Bending Strength at Room Temp | Bending Strength at 1200° C. | |
| $Al_2O_3$ | 0.2 | SiC Whisker | 83.0 | 20 | 20 | Comparison |
| $Y_2O_3$ | 0.2 | | | | | |
| $Al_2O_3$ | 0.3 | " | 92.0 | 55 | 60 | Present Invention |
| $Y_2O_3$ | 0.3 | | | | | |
| $Al_2O_3$ | 10 | " | 96.0 | 65 | 65 | " |
| $Y_2O_3$ | 10 | | | | | |
| $Al_2O_3$ | 21 | " | 97.0 | 65 | 30 | Comparison |
| $Y_2O_3$ | 21 | | | | | |
| $Al_2O_3$ | 5 | SiC Long Fiber | 92.0 | 75 | 70 | Present Invention |
| MgO | 5 | | | | | |
| $Al_2O_3.2AlN$ | 5 | SiC Whisker | 96.0 | 70 | 70 | " |
| $Y_2O_3$ | 3 | | | | | |
| $Al_2O_3$ | 5 | " | 96.0 | 70 | 70 | " |
| $ZrO_2$ | 5 | | | | | |

EXAMPLE 5

A whisker assembly consisting of entangled SiC whiskers, having a porosity of 90%, was prepared and pressed to form a preform having an outer diameter of grain diameter of 1.0 µm and a length of 30 µm were added to a Si powder with a mean grain diameter of 0.5 µm, shaped and sintered in an analogous manner to Example 1.

The thus obtained compact had a composite structure of the β-type $Si_3N_4$ whiskers and β-type $Si_3N_4$ grains and a bending strength at room temperature of 65 kg/mm² and a bending strength at 1200° C. of 50 kg/mm², which properties were considered excellent.

What is claimed is:

1. A process for the production of a ceramic compact, which consists essentially of shaping ceramic fibers into a shaped body having a porosity of 95 to 55%, impregnating the shaped body with a slurry containing a ceramic powder or silicon metal powder as a predominant component by a centrifugal casting method, drying and then sintering by reaction sintering in a nitrogen atmosphere at a temperature of 1300°–1450° C., wherein the ceramic fibers are selected from the group consisting of aluminum oxide, silicon carbide, silicon nitride, zirconium oxide, carbon, potassium titanate and mixtures thereof, and wherein the ceramic powder is selected from the group consisting of silicon carbide, silicon nitride, alumina, zirconium oxide and mixtures thereof.

2. A process for the production of a ceramic compact, which consists essentially of preparing a shaped body of silicon in which ceramic fibers in an amount of 0.1 to 45% by volume based upon the volume of the ceramic compact are uniformly dispersed in the body of silicon by dispersing silicon powder and ceramic fibers in a solvent to form a slurry, charging the slurry in a mold through which only the solvent is permitted to pass and then subjecting the slurry to centrifugal force, thus forming the silicon body containing the ceramic fibers oriented as a result of such centrifugal force and then heating and nitriding the shaped body in a nitrogen atmosphere at a temperature of 1300°–1450° C. to form a fiber-reinforced silicon nitride compact, wherein the ceramic fibers are selected from the group consisting of aluminum oxide, silicon nitride, carbon, potassium titanate, silicon carbide and zirconium oxide and mixtures thereof.

3. A process for the production of a ceramic compact which consists essentially of uniformly dispersing in silicon, by centrifugal force, ceramic fibers in an amount of 0.1 to 45% by volume based upon the volume of the ceramic compact and at least one member selected from the group consisting of aluminum oxide, aluminum nitride, zirconium oxide, yttrium oxide, magnesium oxide, cerium oxide and lanthanum oxide and mixtures thereof in a proportion of 0.5 to 40% by weight based on the weight of the ceramic compact and then heating and nitriding the shaped body in a nitrogen atmosphere at a temperature of 1300°–1450° C. to form a fiber-reinforced silicon nitride compact, wherein the ceramic fibers are selected from the group consisting of aluminum oxide, silicon nitride, carbon, potassium titanate, silicon carbide and zirconium oxide and mixtures thereof.

4. The process of claim 1, wherein the ceramic fibers are ceramic whiskers.

5. The process of claim 4, wherein the ceramic whiskers are silicon carbide whiskers.

* * * * *